United States Patent [19]
Kendall et al.

[11] 3,789,709
[45] Feb. 5, 1974

[54] ORBITAL CRANKSHAFT LATHE

[75] Inventors: George A. Kendall; Donald E. Roseberry, both of Saginaw, Mich.

[73] Assignee: The Wickes Corporation, Saginaw, Mich.

[22] Filed: May 22, 1972

[21] Appl. No.: 255,445

[52] U.S. Cl. .................................. 82/9, 51/105 SP
[51] Int. Cl. .................................................. B23b 5/18
[58] Field of Search ................ 82/9, 27; 51/105 SP

[56] References Cited
UNITED STATES PATENTS

| | | | |
|---|---|---|---|
| 2,184,591 | 12/1939 | Groene | 82/9 |
| 3,487,734 | 1/1970 | Aihara | 82/27 X |
| 2,531,616 | 11/1950 | Floeter | 82/9 |
| 2,421,147 | 5/1947 | Groene | 82/9 |

*Primary Examiner*—Leonidas Vlachos
*Attorney, Agent, or Firm*—Learman & McCulloch

[57] ABSTRACT

A crankshaft lathe having orbiting girts mounting tool holders which have tools for simultaneously machining the crank pins of a multiple throw crankshaft. The girts and master crankshaft assembly on which they are mounted are moved in a tool feeding stroke by a draw member which is in axial alignment with the resultant horizontal component of thrust exerted by the tools on the workpiece. Moreover, the ways, on which the master crankshaft and tool girt assembly move, are substantially in alignment with this resultant force component, the ways being split to accommodate the lower master crankshaft between them and permit this.

7 Claims, 3 Drawing Figures

ORBITAL CRANKSHAFT LATHE

BACKGROUND OF THE INVENTION

Prior art machines of this character, as for example embodied in U.S. Pat. Nos. 1,938,696 and 2,299,976, have not been as rigid as desired, and in machining heavy, multiple throw crankshafts which may, for instance, weight up to several hundred pounds, there has been some tool chatter which prevented the precision machining desired.

One of the prime objects of the present invention is to provide a more rigid lathe construction, with components of no greater weight or size, which materially decreases tool chatter and permits the machinist to hold sizes more accurately than previously.

Another of the prime objects of the invention is to provide a machine of this character in which couple forces which formerly created internal preloading stresses and distortions, are substantially avoided.

A further object of the invention is to provide a machine which does not require the use of compensating members to overcome couple forces which are developed in the machine, and in which the tool holder assembly feeds smoothly and is not subjected to forces tending to bind the girt and master crankshaft assembly slide, or to distort it and affect the ultimate machining result.

It is a further object of the invention to provide a machine of the character described which can be economically manufactured and sold, while providing much better machining results.

Other objects and advantages of the invention will be pointed out specifically or will become apparent from the following description when it is considered in conjunction with the appended claims and the accompanying drawings, in which:

Referring now more particularly to the accompanying drawings, the machine comprises a frame structure, generally indicated at B which includes a U-shaped bed 10 rigidly joined to a head and tail stock supporting table structure 11 in any suitable manner, such as by rigidly bolting the structures together. It is important to note that the bed portion 10 is recessed as at 12 for a purpose which will later be described.

Figure 1:
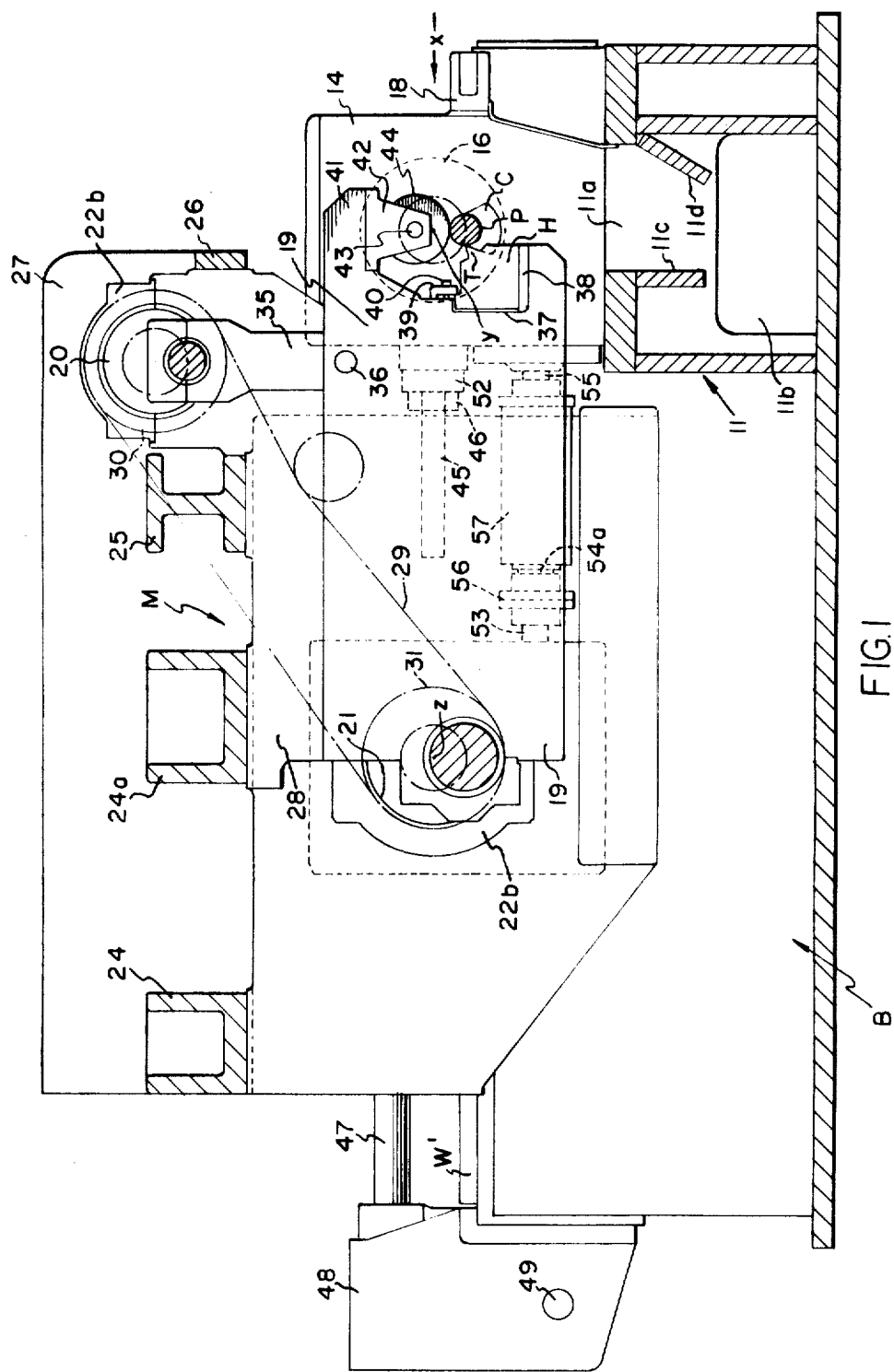
FIG. 1 is a partly sectional, partly schematic, side elevational view showing the tool holder and girt assembly in a final position in which the required cut has been completed.

Supported on the table structure 11 are transversely spaced head and tail stocks 13 and 14 respectively, which include chucks 15 and 16 for receiving the end journals of the crankshaft C to be machined. One or more conventional steady rests 17 rigidly mounted on bed or table section 11 may be provided to aid in supporting the crankshaft C in the usual manner as required by the particular machining operation. A head and tail stock connecting member 18 (see FIG. 1) is provided to back the steady rest members and oppose the tool forces which are applied thereto. The bed or table section 11 has an opening 11a provided in its top surface intermediate the head and tail stock sections 13 and 14 as shown in FIG. 1, to permit chips to fall to a take-away conveyor (not shown) provided in the opening 11b in bed section 11. The members 11c and 11d are chip deflector members for channeling the chips to the chip discharge conveyor (not shown).

Figure 3:
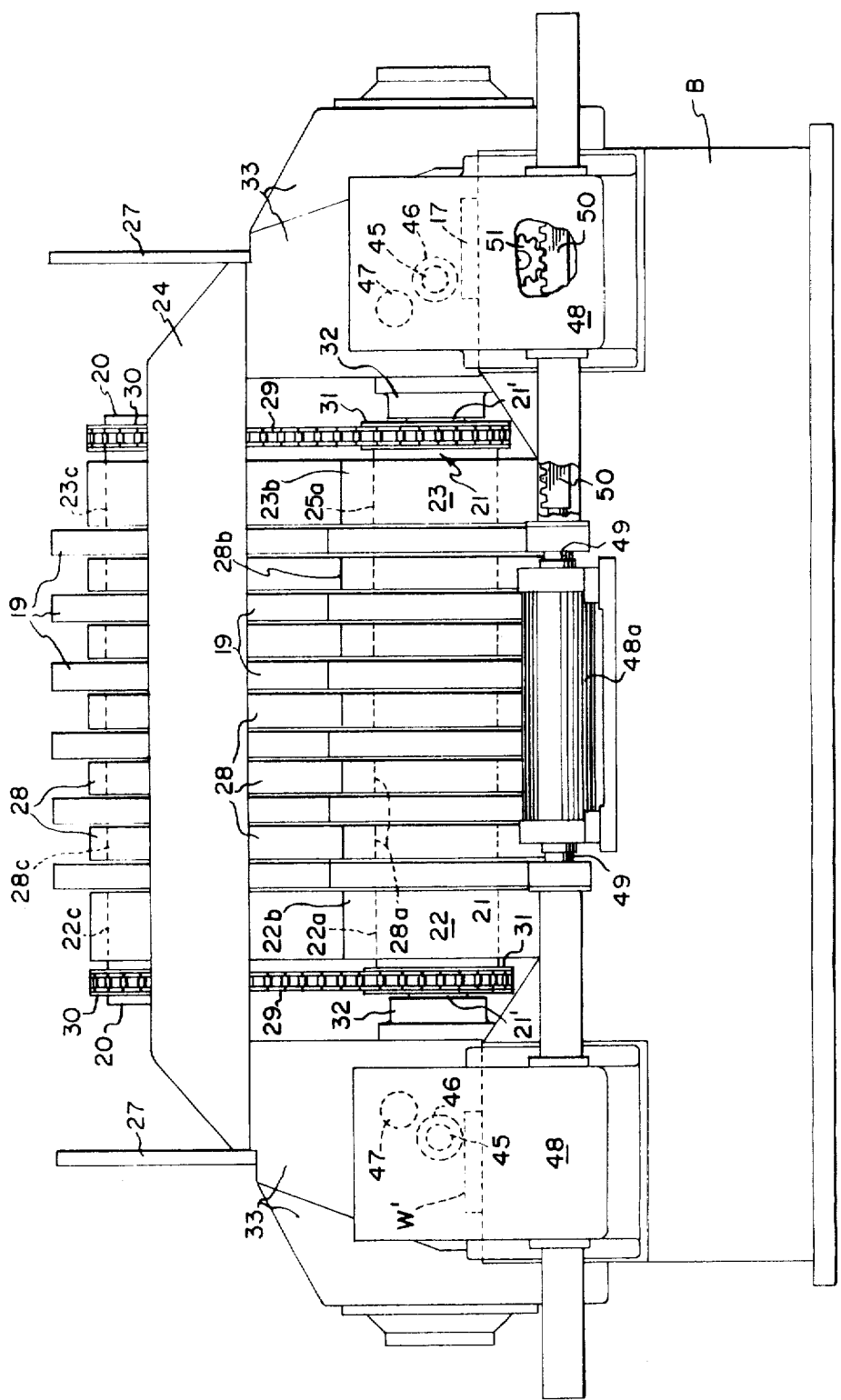
FIG. 3 is a rear elevational view of the machine.

Provided on the bed section 10 on either side of opening 12, are sets or pairs of hardened front and rear ways W and W', respectively. Mounted to move fore and aft on the ways W and W' is the master crankshaft and girt assembly, generally designated M, which includes girts 19 mounted on the crank pins of upper and lower master crankshafts 20 and 21 respectively. The master crankshafts 20 and 21 are, of course, "masters" for the crankshaft to be machined and the number of girts 19 employed will equal the number of crankshaft crank pins to be machined simultaneously by the machine. As shown, the master crankshafts and girts are carried by a slide frame structure which includes side plates 22 and 23 (FIG. 3), which are connected by cross members 24, 24a, 25 and a front tie plate 26. Guard plates 26 may be provided to enclose the sides of the machine at the top as indicated.

The end journals of the master crankshaft 21, as distinguished from the girt mounting pins which are transversely aligned with the workpiece crank pins to be machined, are received in openings 22a and 23a provided in the end walls 22 and 23, and also in openings 28a (see FIG. 3), provided in spacers or guides 28 which are rigidly anchored to the cross members 24a and 25. Similarly, the journals of the identical upper master crankshaft 20 are received in openings 22c and 23c in the side members 22 and 23, and openings 28c provided in the upper ends of the spacers 28.

The master shafts 20 and 21 are, of course, mounted in identical angular disposition and the upper master crankshaft 20 may be driven by the lower master crankshaft 21 to maintain absolute synchronization by chains 29 trained around sprockets 30 provided on the end journals of the master crankshaft 20 and sprockets 31 provided on the end journals of the master cranksahft 21. The extreme reduced ends 21' (FIG. 3) of master crankshaft 21 are coupled, via coupling members 32, to gear reduction boxes 33 driven, via common shafting, by the motor which drives the crankshaft C to be machined in the usual manner. Gear boxes 33 may be connected by rear tie beam 24. Upper and lower journal caps 22b and 23b are provided for the side plates 22 and 23 and similar upper and lower journal caps 28b, are provided on the spacers 28.

As usual, a connecting link 35 is provided to connect each girt 19 to the upper master crandshaft 20, the connecting rod 35 being pivotally connected to each girt 19 via a pin 36 which allows a certain vertical play of the girt relative to the connecting rod 35. Because the work essentially is performed by the lower master crankshaft 21 during the machining operation, the upper master crankshaft 20 can be of reduced size.

Each girt 19 mounts a tool holder assembly H, in a recessed portion 37 thereof, on front to rear extending way blocks 38, the tool holder assembly H being releasably clamped at its upper end by a plate 39, secured by bolt 40. Suitable clamping members (not shown) are also provided to releasably secure the tool holder assembly H in position on the front to rear extending way blocks 38. For purposes of simplicity, the tools T are simply shown in FIG. 1, but it is to be understood that the holder H would normally be carrying multiple tools in the conventional manner.

Dependent from an upper arm 41 of each girt 19, is a roller mount 42 supporting a pin 43 on which the workengaging roller 44 is mounted. During machining of the workpiece, vertical thrust is taken by the various rollers 44 engaging the various crank pins P on the crankshaft C being machined. The crankshaft C being machined is symmetric and, for example, a six-throw crankshaft will have pins located 120° apart. Accordingly, the resultant horizontal component of tool reaction force will be applied to the master crankshaft and girt assembly along a resultant force line $x$ which is in horizontal alignment with the axis of rotation $z$ of master crankshaft 21 and the axis of rotation $y$ of the crankshaft C being machined.

Figure 2:
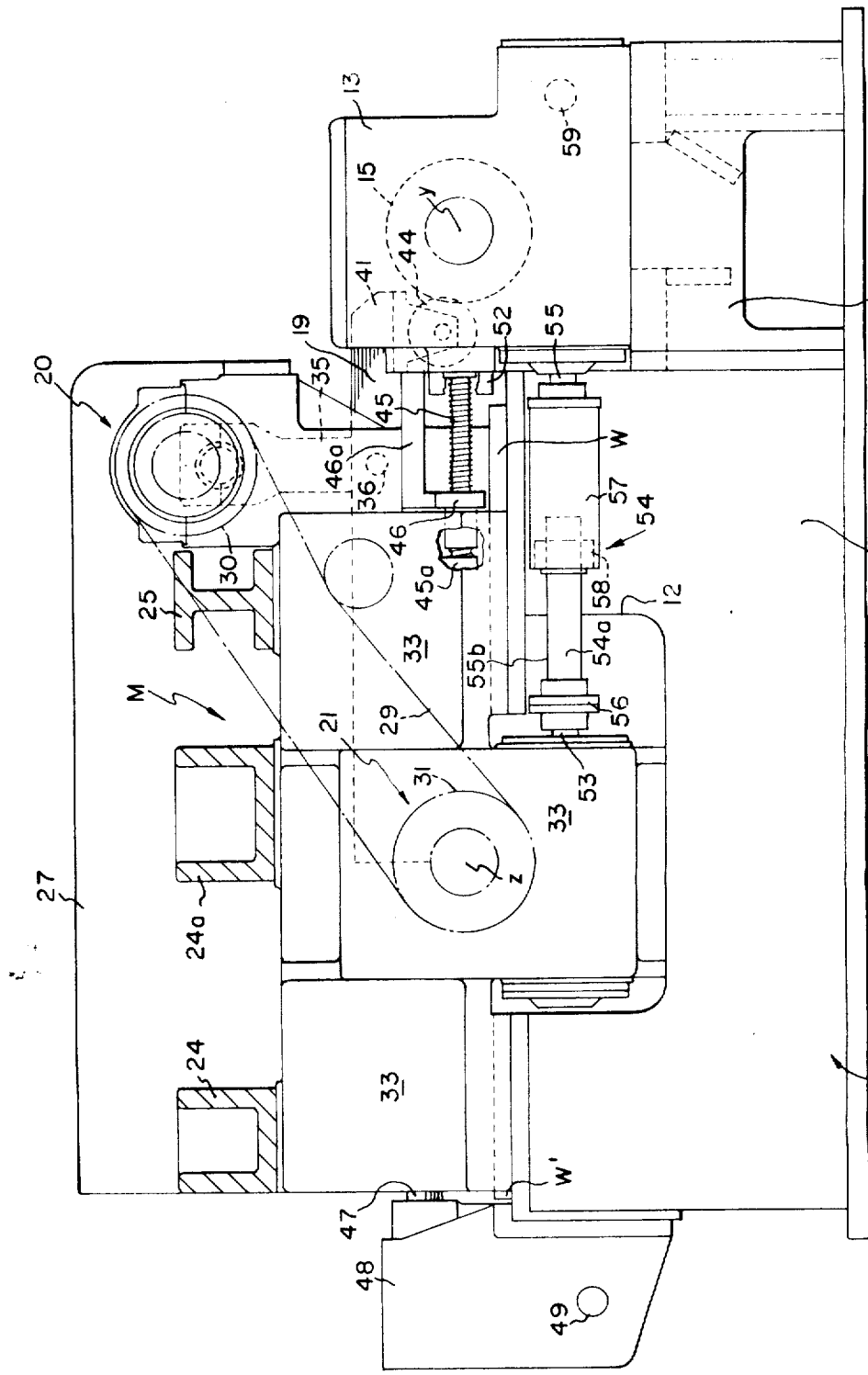
FIG. 2 is a similar, partly schematic, side elevational view with the said assembly shown in withdrawn position, retracted from the workpiece.

Mounted on the head stock 13 and tail stock 14, to project rearwardly therefrom in horizontal alignment with the axis of rotation $y$ of the crankshaft being machined and the axis of rotation $z$ of master crankshaft 21, are a pair of ball screws 45 (FIG. 2). The ball screws 45 at each side of the machine are journaled in suitable bearings (not shown) provided in the head and tail stock assemblies 13 and 14 and suitable bearings 45a in gear housings 33. The ball screws 45 are received by ball nuts 46 depending from arms 46a fixed to the head and tail stock assembly housings 13 and 14. Rotation of the shafts 45, which are axially fixed, will accordingly draw the master shaft and girt assembly M forwardly and rearwardly, dependent on the direction of rotation.

The shafts 45 may be driven by front to rear extending drive shafts 47, which extend into both the head stock 13 and tail stock 14 to drive the shafts 45 via suitable gearing provided therein. At their rear ends, drive shafts 47 are received by gear reduction boxes 48. The shafts 47 are driven by a double hydraulic cylinder 48a (FIG. 3), having piston rods 49 extending from its opposite ends which are connected to rack members 50 which mesh with pinions 51 in the gear boxes 48.

Provided on each of the head stock and tail stocks 13 and 14, concentric with ball screw shafts 45, are positive stop sleeves 52 (FIG. 2) which are engaged by the nuts 46 at the time machining feed or travel terminates to indicate that the crank pins have been turned to the final diameter desired.

Provided to drive the input shaft 53 of the gear box 33 at each side of the machine, are telescoping drive assemblies, generally designated 54 to drive the shafts 53 from the output shafts 55 provided on each of the head and tail stock assemblies 13 and 14. The telescoping drive assemblies 54 may comprise ball splined drive couplings of conventional character, such as provided by Saginaw Steering Gear Division, of General Motors Corporation. Briefly, such assemblies 54 comprise shafts 45a connected by means of couplings 56 to the shafts 53. The shafts 54a being received within sleeves 57 into which they may telescope and being driven by means such as splines 55b engaged by balls in a cartridge 58 carried at the rear end of each sleeve 57 and transferring rotary movement of each sleeve 57 into its shaft 54a.

It is to be understood that the output shafts 55 provided on each head and tail stock assembly 13 and 14, are driven via gearing (not shown) provided in the head and tail stock assembly 13 and 14 which connects also with the chucks rotating the crankshaft C to be machined, and accordingly driving the master crankshafts 21 and 20 in angular synchronism therewith. Any suitable electric motor may be connected to drive the gearing in the head and tail stock assembly 13 and 14 in the usual manner, via an input shaft 59.

In operation and, with the parts disposed initially in the positions in which they are shown in FIG. 2, with the master crankshaft and girt assembly retracted from the axis of rotation of the crankshaft to be machined, a crankshaft to be machined is first mounted in position to be rotated by the chucks 15 and 16 in the usual manner and clamped in the steady rests which are used. Location of the crankshaft so that it properly aligns with the master crankshafts 20 and 21 is automatically taken care of in the usual manner by mechanism (not shown) in the chucks 15 and 16, which insure radial and axial alignment. Once the crankshaft to be machined is clamped in position to be rotated with chucks 15 and 16, the motor driving input shaft 59 is started and the crankshaft to be machined is rotated about its end journals in the usual manner. Thereafter, hydraulic fluid is supplied to the double piston cylinder 48a, first at a rapid traversing rate, and later as the tool system T nears the pins to be machined, at a slower feed rate as desired. The rate of movement of the master crankshaft and girt assembly M toward the rotating workpiece will be varied in the usual manner through valving systems of conventional character which consider the rotational speed of the workpiece, but which form no part of the present invention.

In view of the fact that the axis of rotation of master crankshaft 21 and axis of rotation of the crankshaft C being machined, are in exact horizontal alignment with the axes of ball screws 45, no couple forces are exerted by the reaction tool forces (because resultant tool reaction force is exerted horizontally in a plane aligned horizontally with the axes of shafts 45). Since the rollers 44 take care of vertical tool reaction forces, no offset forces are applied which would tend to distort the parts and produce undesirable machining chatter. Moreover, inasmuch as the ways 16 and 17 are also substantially horizontally aligned with axis $y$ and the axis of rotation $z$ of master crankshaft 21, i.e. within 3½ inches of the horizontal line $x$, no forces are exerted which tend to bind the carriage assembly 18 as it moves to and fro.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

We claim:

1. In an orbital crankshaft lathe; longitudinally disposed frame means; head and tail stock assembly means having transversely spaced apart work holders thereon for rotatably supporting a transversely disposed multiple throw crankshaft workpiece having symmetrically disposed axially offset crankpins; spindle means having an axis of revolution associated with said work holders for revolving the workpiece about an axis of revolution; a master crankshaft and girt assembly comprising master crankshaft means for the crankshaft to be machined, with axially offset, symmetrically disposed crankpins corresponding to the crankpins of the crankshaft to be machined, and girts mounted on the correspondingly axially offset crankpins of the master crankshaft means to orbit thereon; a tool holder, mounted on each girt, for a cutting tool which engages one of the crankpins of the crankshaft to be machined; means for revolving said master crankshaft means in synchronism with the rotation of the crankshaft to be machined; and drawbar means substantially longitudinally aligned with the said axis of revolution of said spindle means for moving the head and tail stock assembly means and master crankshaft and girt assembly relatively in a path to feed the tools in a longitudinal machining path.

2. The combination defined in claim 1 wherein longitudinally extending ways provided on said frame means, substantially in alignment with said drawbar means, support said master crankshaft and girt assembly for to-and-fro longitudinal movement toward and away from the head and tail stock assembly means and the workpiece supported thereby; and said drawbar means connects with said master crankshaft and girt assembly.

3. The combination defined in claim 2 in which said ways extend at a level only slightly below said axis of revolution of the spindle means.

4. The combination defined in claim 2 in which said master crankshaft means includes a master crankshaft journaled to rotate about an axis in longitudinal alignment with said axis of revolution of the spindle means, and said ways comprise spaced apart front and rear way portions to accommodate said master crankshaft and permit its movement with the master crankshaft and girt assembly between said front and rear way portions.

5. The combination defined in claim 4 in which telescopable drive means connects the head and tail stock assembly work revolving means and said master crankshaft to drive one from the other.

6. The combination defined in claim 5 in which said master crankshaft means includes a lower master crankshaft and an upper master crankshaft and means drive one from the other in synchronism.

7. The combination defined in claim 1 in which said drawbar means comprises ball screws connected between the master crankshaft and girt assembly and the head and tail stock assembly means, and ball nuts thereon; there being ball nut stops on said head and tail stock assembly means in longitudinal alignment with the axis of revolution of the spindle means.

* * * * *